United States Patent
Teicholz et al.

(10) Patent No.: US 10,023,319 B2
(45) Date of Patent: Jul. 17, 2018

(54) GAS TURBINE ENGINE WITH PROGRESSIVE STALL RECOVERY

(71) Applicant: United Technologies Corporation, Farmington, CT (US)

(72) Inventors: Matthew D. Teicholz, Mystic, CT (US); Stewart B. Hatch, Monson, MA (US); Wyatt S. Daentl, Stafford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/258,197

(22) Filed: Sep. 7, 2016

(65) Prior Publication Data

US 2018/0065755 A1    Mar. 8, 2018

(51) Int. Cl.
| | | |
|---|---|---|
| G06F 19/00 | (2018.01) |
| B64D 31/06 | (2006.01) |
| F04D 27/00 | (2006.01) |
| F04D 29/32 | (2006.01) |
| F04D 25/04 | (2006.01) |
| F01D 5/02 | (2006.01) |
| F01D 17/10 | (2006.01) |
| F01D 17/14 | (2006.01) |
| F01D 17/16 | (2006.01) |
| B64D 27/10 | (2006.01) |

(52) U.S. Cl.
CPC ............ *B64D 31/06* (2013.01); *B64D 27/10* (2013.01); *F01D 5/02* (2013.01); *F01D 17/105* (2013.01); *F01D 17/145* (2013.01); *F01D 17/162* (2013.01); *F04D 25/045* (2013.01); *F04D 27/001* (2013.01); *F04D 29/321* (2013.01); *F05D 2220/323* (2013.01); *F05D 2270/102* (2013.01); *F05D 2270/54* (2013.01)

(58) Field of Classification Search
CPC ............ B64D 31/06; B64D 27/10; F01D 5/02
See application file for complete search history.

(56) References Cited

U.S. PATENT DOCUMENTS

| | | |
|---|---|---|
| 4,507,915 A | 4/1985 | Evans |
| 4,603,546 A | 8/1986 | Collins |
| 4,984,425 A | 1/1991 | Smith |
| 6,364,602 B1 | 4/2002 | Andrew et al. |
| 2008/0234994 A1* | 9/2008 | Goebel ............... G06F 17/5009 703/7 |
| 2013/0199197 A1 | 8/2013 | Beaud et al. |
| 2015/0322814 A1* | 11/2015 | Liu ........................ F01D 21/003 702/182 |

OTHER PUBLICATIONS

EP Application No. 17189489.2 Extended EP Search Report dated Feb. 5, 2018, 7 pages.

* cited by examiner

*Primary Examiner* — Adam M Alharbi
(74) *Attorney, Agent, or Firm* — Cantor Colburn LLP

(57) ABSTRACT

A control system for a gas turbine engine includes a processing system operable to control a speed of the gas turbine engine and a memory system. The memory system is operable to store instructions executable by the processing system to determine at least one performance parameter associated with a stall condition of the gas turbine engine and to incrementally adjust an acceleration rate of the gas turbine engine based on detecting a degraded stall line limit according to the at least one performance parameter.

20 Claims, 4 Drawing Sheets

GAS TURBINE ENGINE WITH PROGRESSIVE STALL RECOVERY

BACKGROUND

This disclosure relates to gas turbine engines, and more particularly to an apparatus, system and method for progressive stall recovery in a gas turbine engine.

Over the course of an operating cycle of a gas turbine engine, a compressor section of the engine may experience compressor stall. Compressor stall is a limiting factor in the operation of gas turbine engines. In modern gas turbine engines, unstable flow may develop in the compressor during acceleration phases and/or under high altitude and lower speed flight conditions. Such unstable flow may lead to stall, which may increase turbine temperature, mechanical vibration, reduced cooling air supplied to the turbine, loss of thrust control, or other undesirable engine operation.

During an engine stall, a pilot-requested action or a control may automatically attempt to recover engine stability and then accelerate back to a power setting commanded by the pilot. Re-acceleration is typically required to be complete within a predetermined time period as part of engine certification. For a healthy engine which has encountered a temporary disturbance, meeting re-acceleration requirements after a stall is usually not a problem. However, for a heavily degraded or damaged engine, re-acceleration may not be possible within the time constraints that typically define control schedules.

Accordingly, it is desirable to provide a method and/or apparatus for improving stall recovery in a gas turbine engine.

BRIEF DESCRIPTION

In an embodiment, a control system for a gas turbine engine includes a processing system operable to control a speed of the gas turbine engine and a memory system. The memory system is operable to store instructions executable by the processing system to determine at least one performance parameter associated with a stall condition of the gas turbine engine and to incrementally adjust an acceleration rate of the gas turbine engine based on detecting a degraded stall line limit according to the at least one performance parameter.

In addition to one or more of the features described above, or as an alternative to any of the foregoing embodiments, further embodiments may include where the at least one performance parameter includes one or more of: a pressure ratio of the gas turbine engine, a rate of speed change of the gas turbine engine, and a temperature of the gas turbine engine.

In addition to one or more of the features described above, or as an alternative to any of the foregoing embodiments, further embodiments may include where detecting the degraded stall line limit includes detecting a stall of the gas turbine engine.

In addition to one or more of the features described above, or as an alternative to any of the foregoing embodiments, further embodiments may include where the acceleration rate is adjusted by performing one or more of: closing a plurality of vanes of the gas turbine engine and opening one or more bleed valves of the gas turbine engine.

In addition to one or more of the features described above, or as an alternative to any of the foregoing embodiments, further embodiments may include where an acceleration schedule is incrementally reduced based on a series of detected stalls of the gas turbine engine, and incremental reduction of the acceleration schedule is limited to a power setting range in a takeoff envelope.

In addition to one or more of the features described above, or as an alternative to any of the foregoing embodiments, further embodiments may include where an acceleration schedule is selected based on a targeted reduction in the acceleration rate below a damaged engine stall line.

In addition to one or more of the features described above, or as an alternative to any of the foregoing embodiments, further embodiments may include where the damaged engine stall line is determined based on one or more of: a damage assessment of the gas turbine engine and at least one detected stall of the gas turbine engine.

According to an embodiment, a gas turbine engine of an aircraft includes a compressor section, a turbine section, and a control system. The control system includes a processing system operable to control a speed of a spool that interconnects the compressor section and the turbine section. The control system also includes a memory system operable to store instructions executable by the processing system to determine at least one performance parameter associated with a stall condition of the gas turbine engine and to incrementally reduce an acceleration rate of the gas turbine engine based on detecting a degraded stall line limit according to the at least one performance parameter.

According to an embodiment, a method for progressive stall recovery of a gas turbine engine includes determining, by a control system, at least one performance parameter associated with a stall condition of the gas turbine engine. An acceleration rate of the gas turbine engine is incrementally reduced based on detecting a degraded stall line limit according to the at least one performance parameter.

A technical effect of the apparatus, systems and methods is achieved by progressive stall recovery in a gas turbine engine as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various embodiments of the present disclosure are related to progressive stall recovery in a gas turbine engine. A control system can monitor various performance parameters that may indicate a stall of the gas turbine engine has occurred or likely will occur. If more than one stall occurs and/or there is evidence of likely damage to the gas turbine engine, adaptive and alternate control schedule can be selected to attempt to avoid further stalls while keeping the engine operable with reduced performance. For example, the acceleration schedule can be incrementally reduced if additional stalls are detected or predicted during engine reacceleration.

Figure 1:
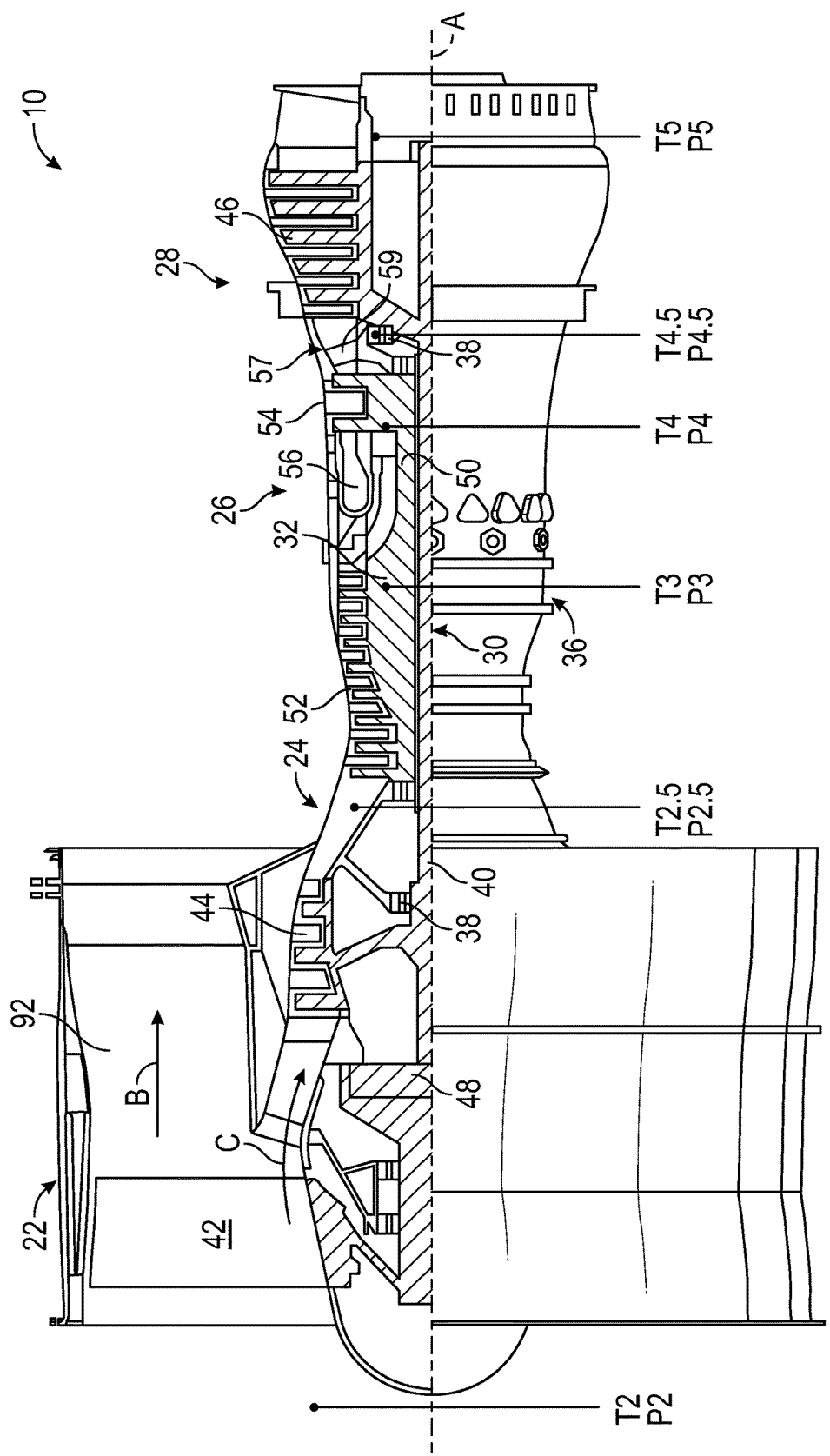
FIG. 1 is a cross-sectional view of a gas turbine engine.

FIG. 1 schematically illustrates a gas turbine engine 10 that can be used to power an aircraft, for example. The gas turbine engine 10 is disclosed herein as a multi-spool turbofan that generally incorporates a fan section 22, a compressor section 24, a combustor section 26 and a turbine section 28. The fan section 22 drives air along a fan flow path B (also referred to as bypass flow path B) established by fan duct 92, while the compressor section 24 drives air along a compressor flow path C (also referred to as core flow path C) for compression and communication into the combustor section 26 then expansion through the turbine section 28. Although depicted as a turbofan gas turbine engine in the disclosed non-limiting embodiment with two turbines and is sometimes referred to as a two spool engine, it should be understood that the concepts described herein are not limited to use with turbofans as the teachings may be applied to other types of turbine engines including three-spool architectures. For example, a three-spool architecture can include three spools that concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The engine 10 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30 in the example of FIG. 1. The high speed spool 32 includes an outer shaft 50 that interconnects a high pressure compressor 52 and high pressure turbine 54. In alternate embodiments, the geared architecture 48 is omitted.

A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

A number of stations for temperature and pressure measurement/computation are defined with respect to the gas turbine engine 10 according to conventional nomenclature. Station 2 is at an inlet of low pressure compressor 44 having a temperature T2 and a pressure P2. Station 2.5 is at an exit of the low pressure compressor 44 having a temperature T2.5 and a pressure P2.5. Station 3 is at an inlet of the combustor 56 having a temperature T3 and a pressure P3. Station 4 is at an exit of the combustor 56 having a temperature T4 and a pressure P4. Station 4.5 is at an exit of the high pressure turbine 54 having a temperature T4.5 and a pressure P4.5. Station 5 is at an exit of the low pressure turbine 46 having a temperature T5 and a pressure P5. Various pressure ratios can be defined for gas turbine engine 10 at different stations, such as a compressor ratio of pressure P3 divided by pressure P2.

Figure 2:
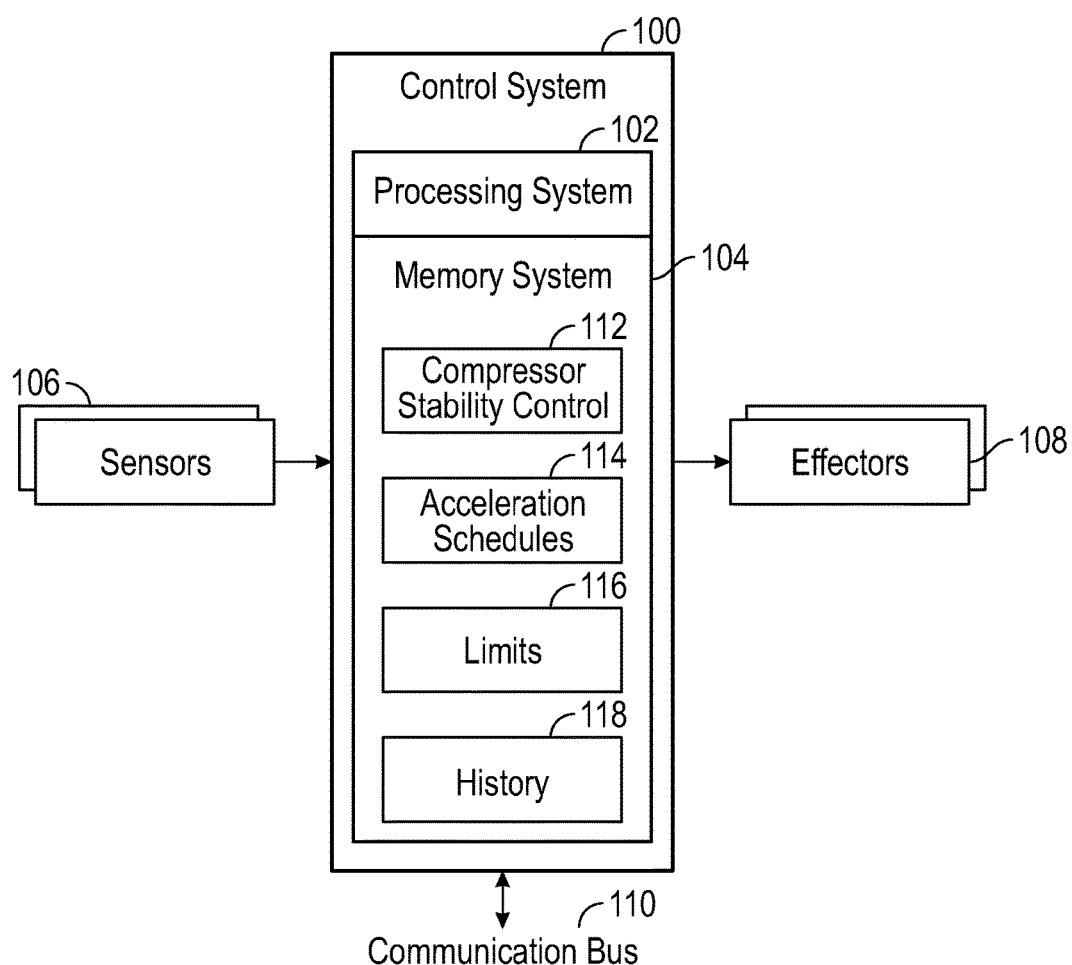
FIG. 2 is a block diagram of a control system of the gas turbine engine of FIG. 1 in accordance with an embodiment of the disclosure.

FIG. 2 is a block diagram of a control system 100 of the gas turbine engine 10 of FIG. 1 in accordance with an embodiment of the disclosure. The control system 100 includes a processing system 102 and a memory system 104. The control system 100 interfaces with a plurality of sensors 106 that are configured to collect diagnostic and operational data related to performance of the gas turbine engine 10 of FIG. 1. In the example of FIG. 2, the sensors 106 can include one or more temperature sensors, pressure sensors, strain gauges, speed sensors, position sensors, accelerometers, and the like. The control system 100 can control a number of effectors 108 to control various subsystems of the gas turbine engine 10 of FIG. 1, such as valves, solenoids, relays, motors, and the like to establish sufficient fuel flow, combustion conditions, engine speeds, cooling flows, pressure ratios, etc. For instance, the effectors 108 can include actuators operable to open or close a plurality of vanes and/or one or more bleed valves that can adjust an acceleration rate of the of the gas turbine engine 10 of FIG. 1.

The memory system 104 can store instructions that are executed by one or more processors of the processing system 102 and data values. The executable instructions may be stored or organized in any manner and at any level of abstraction, such as in connection with a controlling and/or monitoring operation of the sensors 106 and effectors 108. The one or more processors of the processing system 102 can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 104 may include random access memory (RAM), read only memory (ROM), or other electronic, optical, magnetic, or any other computer readable medium onto which is stored data and algorithms in a non-transitory form. The processing system 102 can also interface with a communication bus 110 to send and receive data values and/or executable instructions, including aircraft level data and pilot commands. The control system 100 can include other interfaces (not depicted), such as power management, discrete input/output, wireless communication interfaces, and the like.

In the example of FIG. 2, the memory system 104 includes instructions for compressor stability control 112 to select and/or modify one or more acceleration schedules 114 with respect to limits 116. The acceleration schedules 114 can include a baseline acceleration schedule for normal operating conditions and one or more recovery acceleration schedules that provide a greater stall margin in case of a damaged engine condition, such as a bird strike event. The limits 116 can define when different instances of the acceleration schedules 114 should be selected or when control parameters should be adjusted to reduce an acceleration rate of the gas turbine engine 10 of FIG. 1. For instance, the limits can define flight envelope parameters for altitude, power, speed, and the like, which may be interlocks to prevent selection of a reduced acceleration schedule in a lower power mode and/or a low altitude condition. The limits 116 may also map engine health condition to particular instances of the acceleration schedules 114, where a likely reduction of the stall line exists due to known damage. The limits 116 can also or alternatively limit other control aspects that reduce acceleration rate, such as by controlling flow through and out of the gas turbine engine 10 of FIG. 1. The memory system 104 can also include a history data store 118 to track conditions and selection history of the acceleration schedules 114 to assist in subsequent analysis and future selection and/or modification of the acceleration schedules 114.

Figure 3:
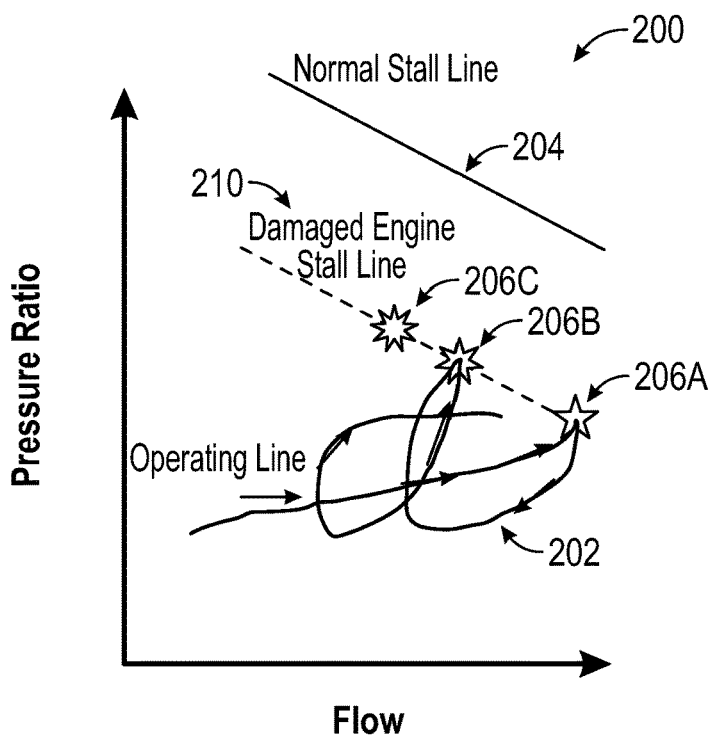
FIG. 3 depicts an example of pressure versus flow relationships in accordance with an embodiment of the disclosure.
Figure 4:
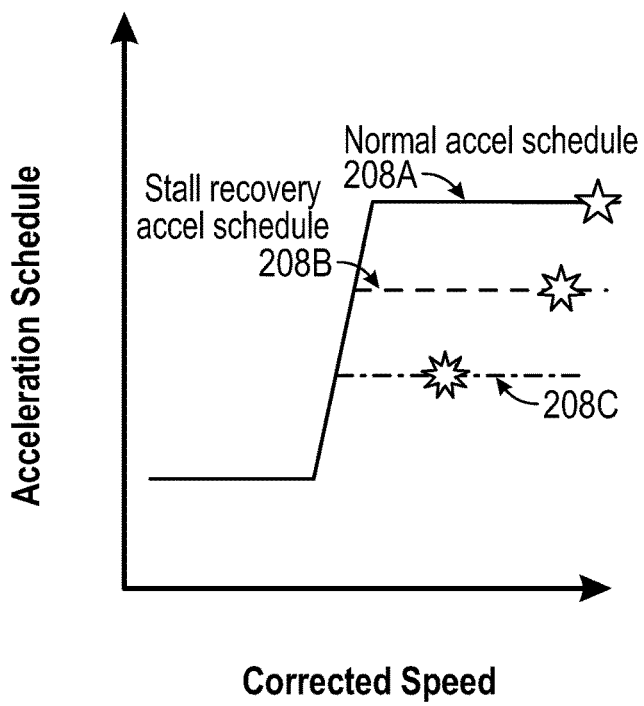
FIG. 4 depicts an example of acceleration schedule versus speed in accordance with another embodiment of the disclosure.

FIG. 3 depicts an example of pressure versus flow relationships 200 in accordance with an embodiment of the disclosure. An operating line 202 includes an example of an attempt to accelerate the gas turbine engine 10 of FIG. 1 towards normal stall line 204. However, due to damage to the gas turbine engine 10, a stall condition 206A may result in stalling the gas turbine engine 10 before reaching the normal stall line 204, where the control system 100 of FIG. 2 initially selects normal acceleration schedule 208A of FIG. 4. The control system 100 of FIG. 2 can determine at least one performance parameter using sensors 106 of FIG. 2 to detect or predict a stall. For instance, one or more of a pressure ratio of the gas turbine engine 10, a rate of speed change of the gas turbine engine 10, and a temperature of the gas turbine engine 10 can be used to detect or predict a stall according to known methods. Upon detecting or predicting a possible stall condition 206A, the control system 100 of FIG. 2 can incrementally reduce the acceleration schedule 208A to acceleration schedule 208B of FIG. 4, for instance, as a lookup or scaling operation in the acceleration schedules 114 of FIG. 2. If while operating according to acceleration schedule 208B as a stall recovery schedule, another stall condition 206B of FIG. 3 is detected or predicted, a further incremental reduction to acceleration schedule 208C of FIG. 4 can be made. Acceleration schedule 208C may result in stall condition 206C of FIG. 3 along damaged engine stall line 210 of FIG. 3; however, if the gas turbine engine 10 is able to recover and reach an acceptable operating condition without stalling, the stall condition 206C may be avoided. In some embodiments, the damaged engine stall line 210 may be predicted based on detected damage to the gas turbine engine 10 and/or identifying at least one of the stall conditions 206A-206C. Although the examples of FIGS. 3 and 4 depict two stall recovery acceleration schedules and associated stall conditions, it will be understood that any number of additional acceleration schedules can be incorporated in various embodiments.

Figure 5:
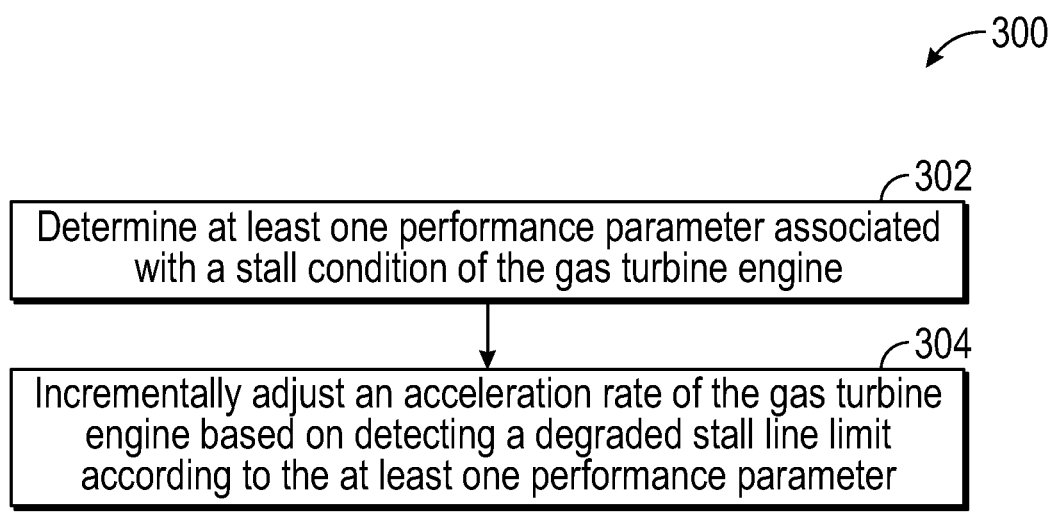
FIG. 5 is a flow chart illustrating a method in accordance with an embodiment of the disclosure.

FIG. 5 is a flow chart illustrating a method 300 for progressive stall recovery of the gas turbine engine 10 of FIG. 1 in accordance with an embodiment. The method 300 of FIG. 5 is described in reference to FIGS. 1-4 and may be performed with an alternate order and include additional steps.

At block 302, control system 100 determines at least one performance parameter associated with a stall condition of the gas turbine engine 10. The at least one performance parameter can include one or more of: a pressure ratio of the gas turbine engine 10, a rate of speed change of the gas turbine engine 10, and a temperature of the gas turbine engine 10. At block 304, the control system 100 can incrementally reduce an acceleration rate of the gas turbine engine 10 based on detecting a degraded stall line limit according to the at least one performance parameter. Detecting the degraded stall line limit can include detecting a stall of the gas turbine engine 10. The acceleration rate can be incrementally reduced based on a series of detected stalls of the gas turbine engine 10. Incremental reduction of an acceleration schedule can be limited to a power setting range in a takeoff envelope, such as a higher power setting above idle where sub-idle speeds are avoided. The acceleration schedule can be selected from acceleration schedules 114 based on a targeted reduction in the acceleration rate below a damaged engine stall line 210. Alternatively, the acceleration rate can be adjusted by performing one or more of: closing a plurality of vanes of the gas turbine engine 10 and opening one or more bleed valves of the gas turbine engine 10. The damaged engine stall line 210 can be determined based on one or more of: a damage assessment of the gas turbine engine 10 and at least one detected stall of the gas turbine engine 10.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A control system for a gas turbine engine, the control system comprising:
   a processing system operable to control a speed of the gas turbine engine; and
   a memory system operable to store instructions executable by the processing system to determine at least one performance parameter associated with a stall condition of the gas turbine engine and to incrementally reduce an acceleration rate of the gas turbine engine based on detecting a degraded stall line limit of the gas turbine engine prior to reaching a stall line indicative of normal operation of the gas turbine engine according to the at least one performance parameter.

2. The control system as in claim 1, wherein the at least one performance parameter comprises one or more of: a pressure ratio of the gas turbine engine, a rate of speed change of the gas turbine engine, and a temperature of the gas turbine engine.

3. The control system as in claim 1, wherein detecting the degraded stall line limit comprises detecting a stall of the gas turbine engine, and the degraded stall line limit is defined based on detecting at least one stall condition and predicts one or more possible stall conditions.

4. The control system as in claim 1, wherein the acceleration rate is adjusted by performing one or more of: closing a plurality of vanes of the gas turbine engine and opening one or more bleed valves of the gas turbine engine.

5. The control system as in claim 1, wherein an acceleration schedule is incrementally reduced as one or more stall recovery schedules of the gas turbine engine based on a series of detected stalls of the gas turbine engine, and incremental reduction of the acceleration schedule is limited to a power setting range in a takeoff envelope.

6. The control system as is claim 1, wherein an acceleration schedule is selected based on a targeted reduction in the acceleration rate below a damaged engine stall line.

7. The control system as in claim 6, wherein the damaged engine stall line is determined based on one or more of: a damage assessment of the gas turbine engine and at least one detected stall of the gas turbine engine.

8. A gas turbine engine of an aircraft, the gas turbine engine comprising:
   a compressor section;
   a turbine section; and
   a control system comprising:
      a processing system operable to control a speed of a spool that interconnects the compressor section and the turbine section; and
      a memory system operable to store instructions executable by the processing system to determine at least one performance parameter associated with a stall condition of the gas turbine engine and to incrementally reduce an acceleration rate of the gas turbine engine based on detecting a degraded stall line limit of the gas turbine engine prior to reaching a stall line indicative of normal operation of the gas turbine engine according to the at least one performance parameter.

9. The gas turbine engine of claim 8, wherein the at least one performance parameter comprises one or more of: a pressure ratio of the gas turbine engine, a rate of speed change of the gas turbine engine, and a temperature of the gas turbine engine.

10. The gas turbine engine of claim 8, wherein detecting the degraded stall line limit comprises detecting a stall of the gas turbine engine, and the degraded stall line limit is defined based on detecting at least one stall condition and predicts one or more possible stall conditions.

11. The gas turbine engine of claim 8, wherein an acceleration schedule is incrementally reduced as one or more stall recovery schedules of the gas turbine engine based on a series of detected stalls of the gas turbine engine, and incremental reduction of the acceleration schedule is limited to a power setting range in a takeoff envelope.

12. The gas turbine engine of claim 8, wherein incremental reduction of the acceleration schedule is limited to a power setting range in a takeoff envelope.

13. The gas turbine engine of claim 8, wherein an acceleration schedule is selected based on a targeted reduction in the acceleration rate below a damaged engine stall line.

14. The gas turbine engine of claim 13, wherein the damaged engine stall line is determined based on one or more of: a damage assessment of the gas turbine engine and at least one detected stall of the gas turbine engine.

15. A method for progressive stall recovery of a gas turbine engine, the method comprising:
   determining, by a control system, at least one performance parameter associated with a stall condition of the gas turbine engine; and
   incrementally reducing an acceleration rate of the gas turbine engine based on detecting a degraded stall line limit of the gas turbine engine prior to reaching a stall line indicative of normal operation of the gas turbine engine according to the at least one performance parameter.

16. The method as in claim 15, wherein the at least one performance parameter comprises one or more of: a pressure ratio of the gas turbine engine, a rate of speed change of the gas turbine engine, and a temperature of the gas turbine engine.

17. The method as in claim 15, wherein detecting the degraded stall line limit comprises detecting a stall of the gas turbine engine, and the degraded stall line limit is defined based on detecting at least one stall condition and predicts one or more possible stall conditions.

18. The method as in claim 15, wherein the acceleration rate is adjusted by performing one or more of: closing a plurality of vanes of the gas turbine engine and opening one or more bleed valves of the gas turbine engine.

19. The method as in claim 15, wherein an acceleration schedule is incrementally reduced as one or more stall recovery schedules of the gas turbine engine based on a series of detected stalls of the gas turbine engine, and incremental reduction of the acceleration schedule is limited to a power setting range in a takeoff envelope.

20. The method as in claim 15, wherein an acceleration schedule is selected based on a targeted reduction in acceleration rate below a damaged engine stall line, and the damaged engine stall line is determined based on one or more of: a damage assessment of the gas turbine engine and at least one detected stall of the gas turbine engine.

* * * * *